United States Patent [19]

Barr et al.

[11] 4,231,102
[45] Oct. 28, 1980

[54] CORDIC FFT PROCESSOR

[75] Inventors: Paul C. Barr, Framingham; Herbert L. Groginsky, Wellesley, both of Mass.

[73] Assignee: Raytheon Company, Lexington, Mass.

[21] Appl. No.: 972,123

[22] Filed: Dec. 21, 1978

[51] Int. Cl.³ .......................................... G06F 15/332
[52] U.S. Cl. .................................... 364/726; 364/730
[58] Field of Search ................ 364/726, 729, 730, 731

[56] References Cited

U.S. PATENT DOCUMENTS

| | | | |
|---|---|---|---|
| 3,544,775 | 12/1970 | Bergland et al. | 364/726 |
| 3,588,460 | 6/1971 | Smith | 364/726 |
| 3,702,393 | 11/1972 | Fuss | 364/726 |
| 3,767,905 | 10/1973 | Garde | 364/726 |
| 3,881,100 | 4/1975 | Works et al. | 364/726 |
| 3,927,312 | 12/1975 | Dickinson | 364/730 |
| 4,075,630 | 2/1978 | Shapiro et al. | 343/5 DP |

OTHER PUBLICATIONS

J. E. Volder, "The Cordic Trigonometric Computing Technique", *IEEE Trans. on Elect. Computers*, vol. EC-B, Sep. 1959, pp. 330-334.
A. M. Despain, "Fourier Transform Computers Using Cordic Iterations", *IEEE Trans. on Computers*, vol. C-23, No. 10, Oct. 1974, pp. 993-1001.
H. L. Groginsky et al., "A Pipeline Fast Fourier Transform", *IEEE Trans. on Computers*, vol. C-19, No. 11, Nov. 1970, pp. 1015-1019.

*Primary Examiner*—Jerry Smith
*Attorney, Agent, or Firm*—William R. Clark; Milton D. Bartlett; Joseph D. Pannone

[57] ABSTRACT

An apparatus for performing a Fourier transform using Cordic techniques. Digital words are pipelined through serial add/subtract stages to provide vector rotations without trignometric lookup tables or multiply operations. The throughput of an FFT butterfly calculation is increased over prior art digital processors. A plurality of apparatus may be pipelined in a system to further increase the throughput rate. Also, the apparatus may be programmed to perform vector rotations through a plurality of angles thus providing the capability to compute FFT's of varying numbers of points.

9 Claims, 6 Drawing Figures

| | 90° | $2^0$ | $2^{-1}$ | $2^{-2}$ | $2^{-3}$ | $2^{-4}$ | $2^{-5}$ | $2^{-6}$ | $2^{-7}$ | $2^{-8}$ | $2^{-9}$ | $2^{-10}$ | $2^{-11}$ | $2^{-12}$ | $2^{-13}$ | $2^{-14}$ | $2^{-15}$ | $2^{-16}$ |
|---|---|---|---|---|---|---|---|---|---|---|---|---|---|---|---|---|---|---|
| $W_0 = 0°$ | 1 | 0 | 0 | 0 | 0 | 0 | 1 | 0 | 1 | 1 | 0 | 0 | 0 | 0 | 1 | 1 | 0 | 0 | 1 |
| $W_1 = 22.5°$ | 1 | 0 | 0 | 1 | 0 | 0 | 1 | 0 | 0 | 1 | 1 | 0 | 1 | 0 | 0 | 0 | 0 | 1 |
| $W_2 = 45°$ | 1 | 0 | 0 | 1 | 1 | 1 | 1 | 1 | 0 | 0 | 0 | 0 | 0 | 1 | 0 | 1 | 0 | 1 |
| $W_3 = 67.5°$ | 1 | 0 | 1 | 0 | 1 | 1 | 0 | 1 | 1 | 0 | 0 | 1 | 0 | 1 | 1 | 1 | 1 | 0 |
| $W_4 = 90°$ | 1 | 0 | 1 | 1 | 1 | 0 | 1 | 0 | 0 | 1 | 1 | 1 | 1 | 0 | 0 | 1 | 1 | 0 |
| $W_5 = 112.5°$ | 1 | 1 | 0 | 1 | 0 | 0 | 1 | 0 | 0 | 1 | 1 | 0 | 1 | 0 | 0 | 0 | 0 | 1 |
| $W_6 = 135°$ | 1 | 1 | 0 | 1 | 1 | 1 | 1 | 1 | 0 | 0 | 0 | 0 | 0 | 1 | 0 | 1 | 0 | 1 |
| $W_7\ 157.7$ | 1 | 1 | 1 | 0 | 1 | 1 | 0 | 1 | 1 | 0 | 0 | 1 | 0 | 1 | 1 | 1 | 1 | 0 |

1 = COUNTER CLOCKWISE
0 = CLOCKWISE

CORDIC FFT PROCESSOR

BACKGROUND OF THE INVENTION

As known in the art, the fast Fourier transform (FFT) has application in many technologies for performing signal analysis such as power spectrum analysis and filter simulation by means of digital computers. For example, FFT processors are commonly used in radar systems for pulse compression and Doppler processing. The Fourier relation is said to map a signal from the time domain into the frequency domain. Conversely, the inverse Fourier relation is said to map from the frequency domain to the time domain. Specifically, in a radar system, the video output of the radar receiver is typically time sampled, each sample being converted into a digital word. It is common for a radar receiver to have two video outputs that are 90° out of phase and called "inphase" and "quadrature" in which case both are simultaneously sampled and digitized. Digital words which may comprise a real part corresponding to the "inphase" channel and an imaginary part corresponding to the "quadrature" channel are processed in parallel form through an FFT processor to produce another set of digital words which correspond to discrete frequency components of the frequency spectrum of the received radar signal.

The FFT is a method for efficiently computing the discrete Fourier transform (DFT) of a series of data samples referred to as a time series. The discrete Fourier transform is defined as $$F_{(k)} = \sum_{n=0}^{N-1} s(n) e^{jnk(\frac{2\pi}{N})}$$

where $F_{(k)}$ is the kth component of the DFT, s(n) denotes the nth sample of the time series consisting of N complex samples; n=0,1, 2, . . . , N−1, and j=−1. Briefly, an FFT is an algorithm which provides a relatively fast means of computing a DFT by reducing the number of operations from approximately $N^2$ to $2N\log_2 N$ as compared to a DFT; this is generally accomplished by reducing the redundant operations and of course also provides a corresponding descrease in computation processing time.

Referring to FIG. 1, a signal flow graph is shown that illustrates the computation of a FFT. The inputs, s(0) through s(7) and generally s(n), are a time series of discrete samples. As is well known, such a time series completely represents the continuous waveform provided the waveform is frequency band limited and the samples are taken at a rate that is least twice the highest frequency present in the waveform. It is common to call the samples Nyquist if they are equally spaced and twice the highest frequency. It is noted that the time series is not incrementally ordered from top to bottom; this is referred to as bit reversal, the function of which is to provide "in place" calculations as described by William T. Cochran et al, Proceedings of the IEEE, volume 55, No. 10, October 1967 at page 1670. It is also noted that in radar system applications, the inputs are frequently complex numbers or vector quantities with the real part corresponding to the inphase channel of the receiver and the imaginary part corresponding to the quadrature channel. The number of bits in the digital words of the inputs determines the dynamic range of the system.

The basic building block of an FFT as shown in FIG. 1 is a vector rotation by a complex weighting coefficient, $W_n$, and a sum and difference of the result with another vector. If the unrotated vector is $\vec{A} = R_1 + jI_1$, the rotated vector is $\vec{B} = R_2 + jI_2$, and $W_n = e^{-j\theta}$, the output of the basic building block is given by the following equations.

$$\vec{A}' = R_1 + (R_2 \cos\theta + I_2 \sin\theta) + j[I_1 + (I_2 \cos\theta - R_2 \sin\theta)]$$

$$\vec{B}' = R_1 - (R_2 \cos\theta + I_2 \sin\theta) + j[I_1 - (I_2 \cos\theta - R_2 \sin\theta)]$$

As can be seen from the equation above, $\vec{A}'$ and $\vec{B}'$ can be calculated in a digital computer by a combination of four multiplies and six adds in addition to looking up the trigonometric values in a table. This conventional method of calculation, however, is not fast enough to permit a FFT throughput rate as required by some applications. For example, in radar FFT processing with a waveform of increased time-bandwidth product, an FFT with an increased number of points may be required thus reducing the time allocated for the calculation of each of the basic building blocks.

Recently, the coordinate rotation digital computer (CORDIC) technique was introduced as a method of calculating a vector rotated through a given angle. This technique has also been applied to FFT's. However, there is still a need for a CORDIC unit and a digital processor in general wherein increased throughputs can be realized.

Furthermore, some applications require that an FFT processor with a high throughput rate also have the capability to be programmable such that FFT's of different numbers of points can be performed.

SUMMARY OF THE INVENTION

The invention discloses a plurality of parallel pairs of arithmetic elements each adapted for input of two digital words and providing a sum or difference of two input digital words as an output where they are stored in a storage means, preferably registers. The pairs are connected in a series with connecting means such that if the contents of the storage means of one pair are $X_i$ and $Y_i$ where i is the number of the pair in the series, the inputs provided to the next pair in the series are $X_i$, $Y_i$, $2^{-i}X_i$ and $2^{-i}Y_i$. This is accomplished by hard wired bit transpositioning where necessary. Accordingly, the outputs of said next pair are $X_i \pm 2^{-i}Y_i$ and $Y_i \pm 2^i X_i$, respectively.

Preferably, clocking means are provided to clock digital data through the series. It is also preferable that the arithmetic operation of each element, and more specifically whether each element performs an add or subtract, be determined by a logic input to the element. The logic input for an element is preferably opposite the logic input for the other element of its pair and a logic control means may be provided such that the contents of the last storage means of the series satisfy the CORDIC equations for vector rotation for a given angle. In other words, the apparatus heretofore described accepts two digital word inputs which may be a vector comprising a real and imaginary part and provides an output of the vector rotated through a predetermined angle.

Through the use of the CORDIC technique, the apparatus performs an FFT "butterfly" without any trigonometric lookup tables or multiply operations. The pipelining of data substantially increases the throughput rate of the "butterfly" calculation over prior processors. It is also preferable that apparatus be pipelined to further increase the throughput rate.

BRIEF DESCRIPTION OF THE DRAWINGS

The foregoing and other objects and advantages will be understood more fully in the following detailed description thereof with respect to the accompanying drawings wherein.

DESCRIPTION OF THE PREFERRED EMBODIMENT

Figure 1:
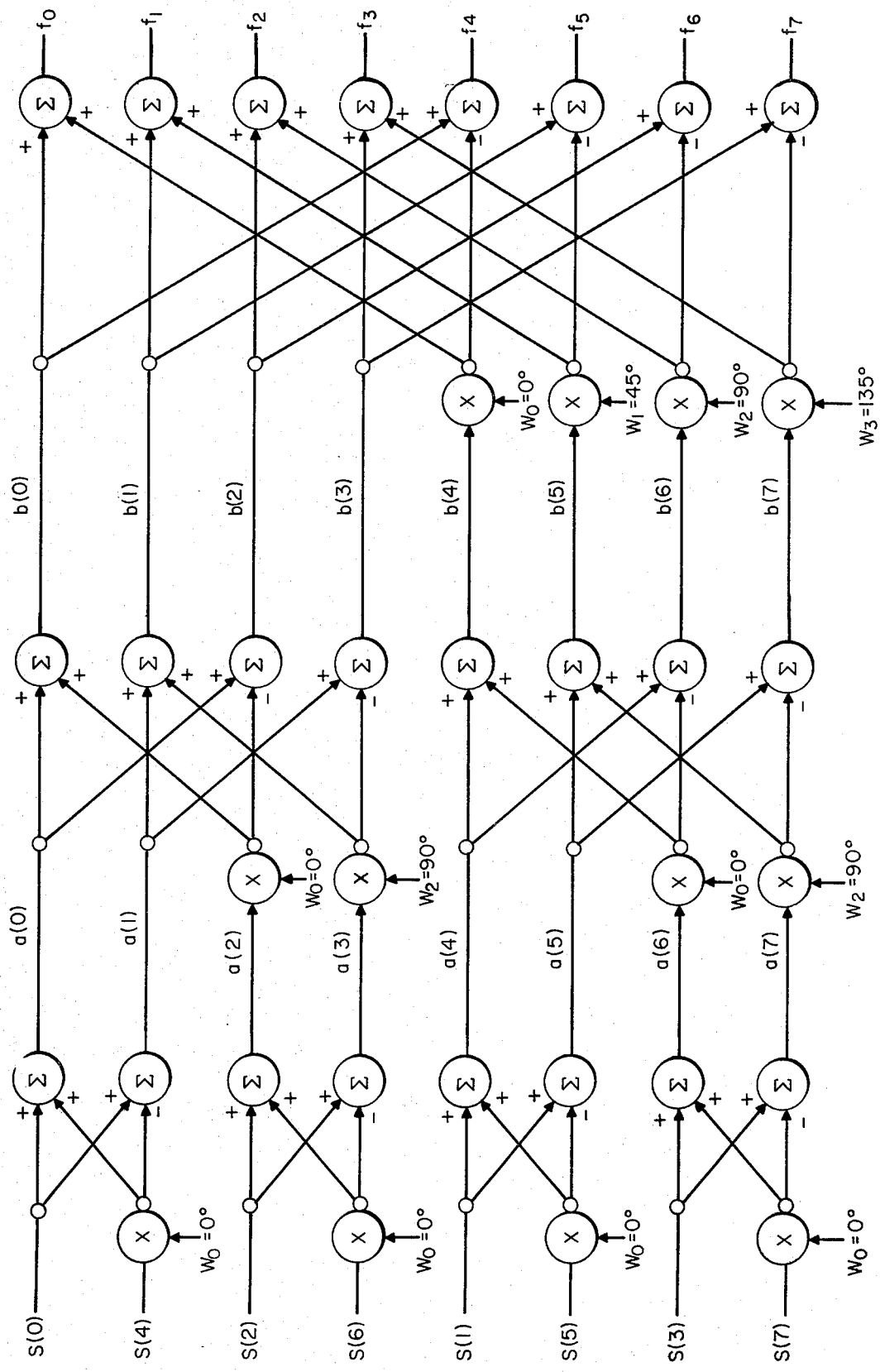
FIG. 1 is a flow diagram of an eight point bit reversed input FFT.

Referring to FIG. 1, a flow diagram known to one skilled in the art and representing a particular discrete FFT is shown. More specifically, it is commonly referred to as an eight point bit reversed input FFT. At the left of the diagram are data points s(0) through s(7) of the time series s(n) which are to be transformed to derive eight discrete frequency components represented by f0 through f7. It is noted that an eight point transform is exemplified herein but in application such as, for example, a radar FFT processor, a larger number of points would commonly be used. In a radar application, the time samples s(n) would typically each be a complex digital word comprising a real part corresponding to the "inphase" component of the sampled signal and an imaginary part corresponding to the "quadrature" or 90° phase shifted component. For example, if the digital word were thirty-two bits, the real part would be sixteen bits and the imaginary part would also be sixteen bits. The number of bits in the digital word relates to the dynamic range or expected variation in the amplitude of the radar returns.

Figure 2:
FIG. 2 is a flow diagram of the basic building block of an FFT which is commonly referred to as a "butterfly"

Referring to FIG. 2, a basic building block of the transform of FIG. 1 is shown. It is noted that if this building block, which has been referred to in the art as a "butterfly", is appropriately performed twelve different times, the frequency components f0 through f7 in FIG. 1 can be calculated from the time series inputs s(0) through s(7). Specifically, referring to FIG. 1, the twelve pairs of inputs are listed below.

| s(0) | s(3) | a(0) | a(4) | b(0) | b(2) |
|------|------|------|------|------|------|
| s(4) | s(7) | a(2) | a(6) | b(4) | b(6) |
| s(2) | s(1) | a(1) | a(5) | b(1) | b(3) |
| s(6) | s(5) | a(3) | a(7) | b(5) | b(7) |

Again referring to FIG. 2, each so called "butterfly" receives two complex digital words, $\vec{A}$ and $\vec{B}$ which, as described before in reference to FIG. 1, are comprised of real and imaginary parts so that they can be expressed by the equations below.

$$\vec{A} = R_1 + jI_1 \quad (1)$$

$$\vec{B} = R_2 + jI_2 \quad (2)$$

where $R_1$ and $R_2$ are the real parts and $I_1$ and $I_2$ are the imaginary parts. Operation 6 is commonly referred to as a weighting or scaling function. $W_n$ is a complex weighting coefficient or scaling factor and can be defined as a vector rotation. Operation 8 is a sum and operation 9 is a difference of two input complex quantities, the direction of flow of which is shown by the arrows. Assuming $$W_n = e^{-j\theta} \quad (3)$$

where, by identity $$e^{-j\theta} = \cos\theta - j\sin\theta, \quad (4)$$

the complex outputs $\vec{A}'$ and $\vec{B}'$ are given by the following equations.

$$\vec{A}' = [R_1 + (R_2 \cos\theta + I_2 \sin\theta)] + j[I_1 + (I_2 \cos\theta - R_2 \sin\theta)] \quad (5)$$

$$\vec{B}' = [R_1 - (R_2 \cos\theta + I_2 \sin\theta)] + j[I_1 - (I_2 \cos\theta - R_2 \sin\theta)] \quad (6)$$

The CORDIC arithmetic units, hereinafter described in detail, compute the real part of the vector rotation of $\vec{B}$ or $R_2 \cos\theta + I_2 \sin\theta$ and the imaginary part of the vector rotation of $\vec{B}$ or $I_2 \cos\theta - R_2 \sin\theta$ without any trigonometric value lookups or multiplications.

The algorithm commonly referred to as the CORDIC technique was initially published by J. E. Volder "CORDIC Trigonometric Computing Technique," IEEE Transactions on Electronic Computers, Volumne EC-B, page 330–334, September, 1959. For clarity herein, the algorithm can be described briefly as a vector rotation accomplished by a step-by-step sequence of psuedo rotations of predetermined angles descreasing in magnitude which are given by the expression:

$$\alpha_i = \tan^{-1} 2^{-(i-2)} \quad (7)$$

where i is the iteration of the pseudo rotation. The first rotation is by 90° with the sequential angles shown below.

$\tan^{-1} 2^0 = 45°$
$\tan^{-1} 2^{-1} = 26.56505118°$
$\tan^{-1} 2^{-2} = 14.03624346°$
$\tan^{-1} 2^{-3} = 7.125016345°$
$\tan^{-1} 2^{-4} = 3.576334374°$
$\tan^{-1} 2^{-5} = 1.789910606°$
$\tan^{-1} 2^{-6} = 0.89517371°$
$\tan^{-1} 2^{-7} = 0.4476141705°$
$\tan^{-1} 2^{-8} = 0.22361050002°$
$\tan^{-1} 2^{-9} = 0.111905677°$
$\tan^{-1} 2^{-10} = 0.0559528917°$
$\tan^{-1} 2^{-11} = 0.0279764496°$
$\tan^{-1} 2^{-12} = 0.013988253°$
$\tan^{-1} 2^{-13} = 0.006594112936°$
$\tan^{-1} 2^{-14} = 0.003497053631°$
$\tan^{-1} 2^{-15} = 0.001748523951°$
$\tan^{-1} 2^{-16} = 0.0008742591107°$ It is noted that by appropriately selecting whether each iteration is a clockwise or counterclockwise rotation, the vector can be rotated to any given angle in a 360° circle with the accuracy depending on the number of iterations. For example, referring to FIG. 3, a table is shown which indicates the direction of rotations for each sequential iteration to perform the vector rotations listed in the left hand column. A "1" indicates an add or counterclockwise rotation and a "0" indicates a subtract or clockwise rotation. The weighting functions listed are for a sixteen point FFT. For example, the CORDIC technique would accomplish a vector rotation of 135° by first rotating counterclockwise 90°, second rotating counterclockwise by $\tan^{-1} 2^0$, third rotating clockwise by $\tan^{-1} 2^{-1}$, fourth rotating counterclockwise by $\tan^{-1} 2^{-2}$, etc.

For the angular rotations of equation (7), the general expressions for the rotation components are given by the equations below.

$$X_{i+1} = X_i - 2^{-i}Y_i \quad (8)$$
$$\text{and} \quad Y_{i+1} = Y_i + 2^{-i}X_i \quad \text{for clockwise} \quad (9)$$
$$\text{or} \quad X_{i+1} = X_i + 2^{-i}Y_i \quad (10)$$
$$\text{and} \quad X_{i+1} = Y_i - 2^{-i}X_i \quad \text{for counterclockwise} \quad (11)$$

It is important to note that by restricting the angular rotation magnitude to equation (7), the right-hand terms of equations (8)–(11) may be obtained by two simultaneous shift and add/subtract operations. This is the fundamental relationship upon which the computing technique is based. Specifically, given values for $X_i$ and $Y_i$, the values for the next iteration, $X_{i+1}$ and $Y_{i+1}$, can be calculated by bit transpositioning the respective $X_i$ and $Y_i$ registers and respectively adding or subtracting the results. It is further noted that an error is inherent in the calculations; this will be discussed later herein.

Figure 3:
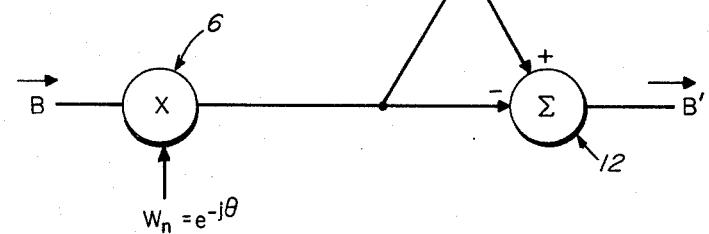
FIG. 3 is a table which indicates the direction of rotations for each sequential iteration to perform vector rotations using the CORDIC technique.
Figure 4:
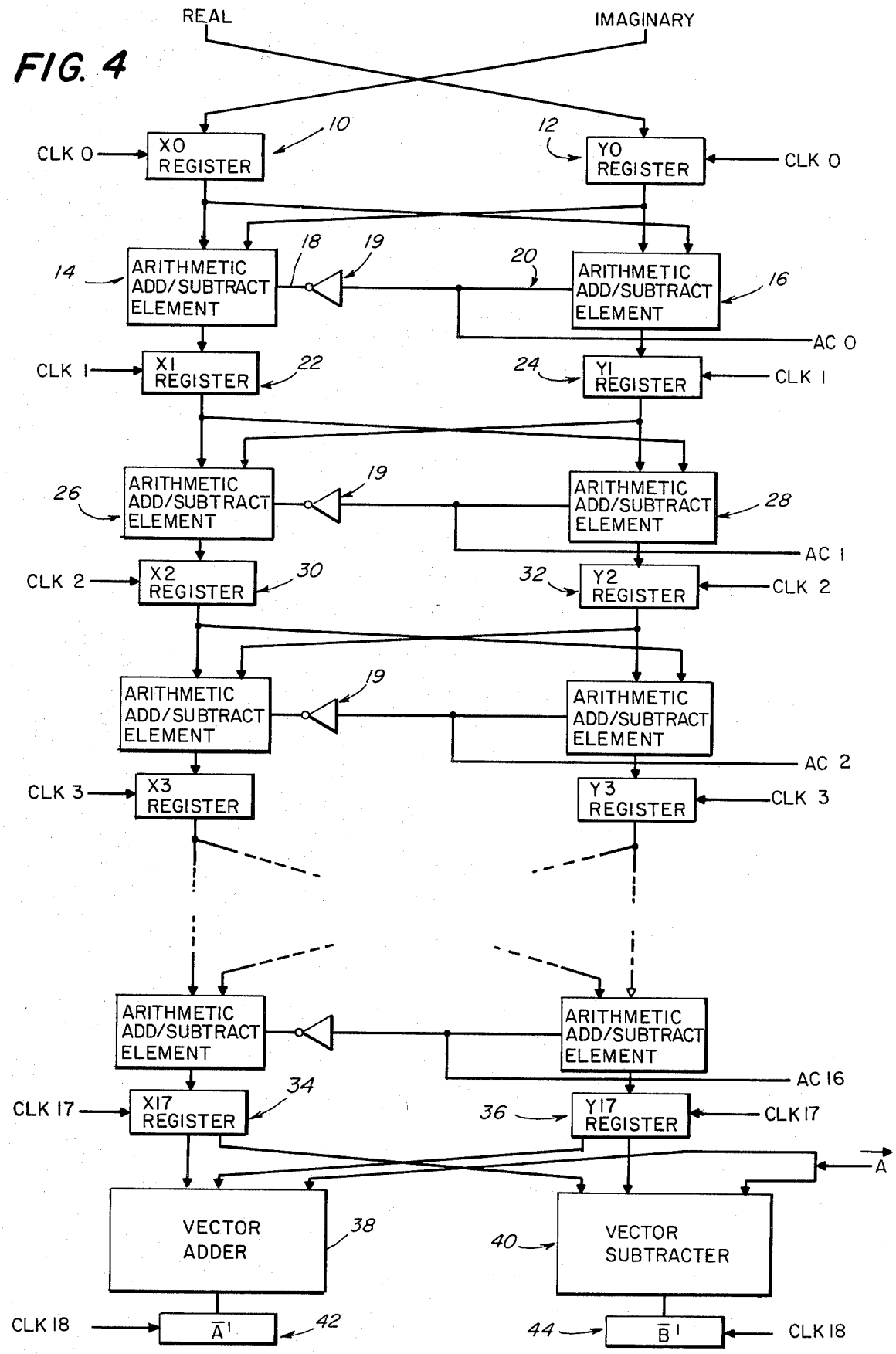
FIG. 4 is a flow diagram embodying the invention and showing the computation of a "butterfly"

Referring now to FIG. 4, a flow diagram for the computation of a "butterfly" in a CORDIC unit without any multiplication or trigonometric value lookup table is shown. Initially, the imaginary part of a digital word corresponding to $\vec{B}$ of FIG. 2 is clocked into eighteen bit register 10 and the real part is clocked in negative two's complement format into eighteen bit register 12. The clocking pulse as shown is CLK0. It is noted that these operations satisfy a CORDIC 90° vector rotation which is the first rotation for all weighting functions given in FIG. 3. More specifically, a counterclockwise 90° vector rotation is unique in that it is a perfect rotation step and expressed by the equations below.

$$X_0 = Y_{input} \quad (12)$$

$$Y_0 = -X_{input} \quad (13)$$

In the next operation level, the contents of registers 10 and 12 corresponding to $X_0$ and $Y_0$ respectively, are simultaneously present at the inputs of conventional arithmetic add/subtract elements 14 and 16. Whether each element 14 and 16 functions as an adder or subtractor is determined by logical inputs 18 and 20 derived from angle control signal AC0. It is noted that there is an inverter 19 between logical inputs 18 and 20 such that when one performs an add, the other subtracts and vice versa. Using a 135° CORDIC vector rotation as an example such that a counterclockwise rotation is indicated for this operation, arithmetic add/subtract element 14 is a add and arithmetic add/subtract element 16 is a subtract. As shown in FIG. 4, the output of arithmetic add/subtract element 14 is clocked into eighteen bit register 22 corresponding to $X_1$ and the output of arithmetic add/subtract element 16 is clocked into eighteen bit register 24 corresponding to $Y_1$. The clocking pulse designated CLK1 follows CLK0 by a sufficient time for arithmetic add/subtract elements 14 and 16 to perform their respective functions. It is noted that the contents of registers 22 and 24 respectively satisfy the CORDIC Equations (8) and (9). More specifically, the equations are given below.

$$X_1 = X_0 + 2^{-0}Y_0 \quad (14)$$

$$Y_1 = Y_0 - 2^{-0}X_0 \quad (15)$$

Still referring to FIG. 4, the contents of registers 22 and 24 are hard wired to arithmetic add/subtract elements 28 and 26, respectively, such that a transportation of one bit is accomplished. More specifically bit 1 of register 22 is hard wired to bit 0 of arithmetic add/subtract element 28, bit 2 of register 22 is hard wired to bit 1 of arithmetic add/subtract element 28, etc. This described hard wiring provides that one-half the contents of register 22 and 24 are respectively connected to arithmetic add/subtract elements 28 and 26. Still assuming an example of CORDIC rotation of 135° and noting that as previously described, arithmetic add/subtract element 26 functions as a subtract and arithmetic add/subtract element 28 functions as an add as determined by AC1 which for example is a logical "0", after CLK2 the contents of eighteen bit registers 30 and 32 respectively satisfy CORDIC Equations (8) and (9) for $X_2$ and $Y_2$ in a clockwise rotation. More specifically the equations are given below.

$$X_2 = Y_1 - 2^{-1}Y_1 \quad (16)$$

$$Y_2 = Y_1 - 2^{-1}X_1 \quad (17)$$

Each successive operation level is performed similar to the level described immediately above. In each level, AC logic inputs are provided to the respective arithmetic add/subtract elements to provide for either a clockwise or counterclockwise rotation as shown by the weighting function codes with reference to FIG. 3. The bit transpositions between registers and arithmetic add/subtract elements are hard wired to satisfy the term $2^{-i}$ as given in CORDIC equations (8) and (9) or (10) and (11). Still using a vector rotation of 135° as an example, the contents of registers 34 and 36, corresponding to X17 and Y17, satisfy the CORDIC equations (10) and (11) and are expressed by the equations below.

$$X_{17} = X_{16} + 2^{-16}Y_{16} \quad (18)$$

$$Y_{17} = Y_{16} - 2^{-16}X_{16} \quad (19)$$

In satisfying these equations, the contents of registers 34 and 36 are respectively the real and imaginary parts of $\vec{B}$ of FIG. 2 as rotated through $W_n$ which for the example given is 135°. Again referring to FIG. 4 the rotated $\vec{B}$ ($X_{17} + iY_{17}$) is added to $\vec{A}$ in vector sum element 38 and subtracted from $\vec{A}$ in vector difference element 40 to obtain $\vec{A}'$ and $\vec{B}'$ in 32 bit registers 42 and 44 respectively.

The flow of digital data heretofore described with reference to FIG. 4 provides the calculation of one "butterfly" as shown in FIG. 2. More specifically, in the example given, one vector designated as $\vec{B}$ is vector rotated through 135° by a sequence of rotational steps through angles given by Equation (7) and the resulting vector is added to and subtracted from another vector designated as $\vec{A}$. The final two vectors are $\vec{A}'$ and $\vec{B}'$ as shown in FIG. 2. A substantial advantage of the data flow and the device implementing it is that data can be pipelined thereby increasing the throughput of the FFT processor. Specifically, each vector to be rotated is immediately followed down the register series by other vectors to be rotated. In actual operation, all of the CLK lines designated CLK0-CLK18 in FIG. 4 are common. Therefore, each individual CLK pulse advances each vector comprising the contents of the two corresponding X and Y registers to the next corresponding pair of X and Y registers. Accordingly, the throughput rate after an initial start up for the "butterfly" calculation is equal to the rate at which data can be clocked through an arithmetic add/subtract element and into the next register in the series. In other words, vectors $\vec{A}$ and $\vec{B}$ as shown in FIG. 2 are clocked into and other non-corresponding vectors $\vec{A}'$ and $\vec{B}'$ are clocked out of the unit shown in FIG. 4 at a rate equal to the CLK pulses. The "butterfly" throughput rate using state of the art digital techniques is presently increasing rapidly because of significant developments in integrated circuit technology. It is therefore somewhat inappropriate to discuss absolute throughput rates of the present invention with respect to the prior art. What is important to note is that regardless of the technology used or the advancement in technology, the time required to perform an add or subtract is and will be significantly less than the time to perform a multiply.

Figure 5:
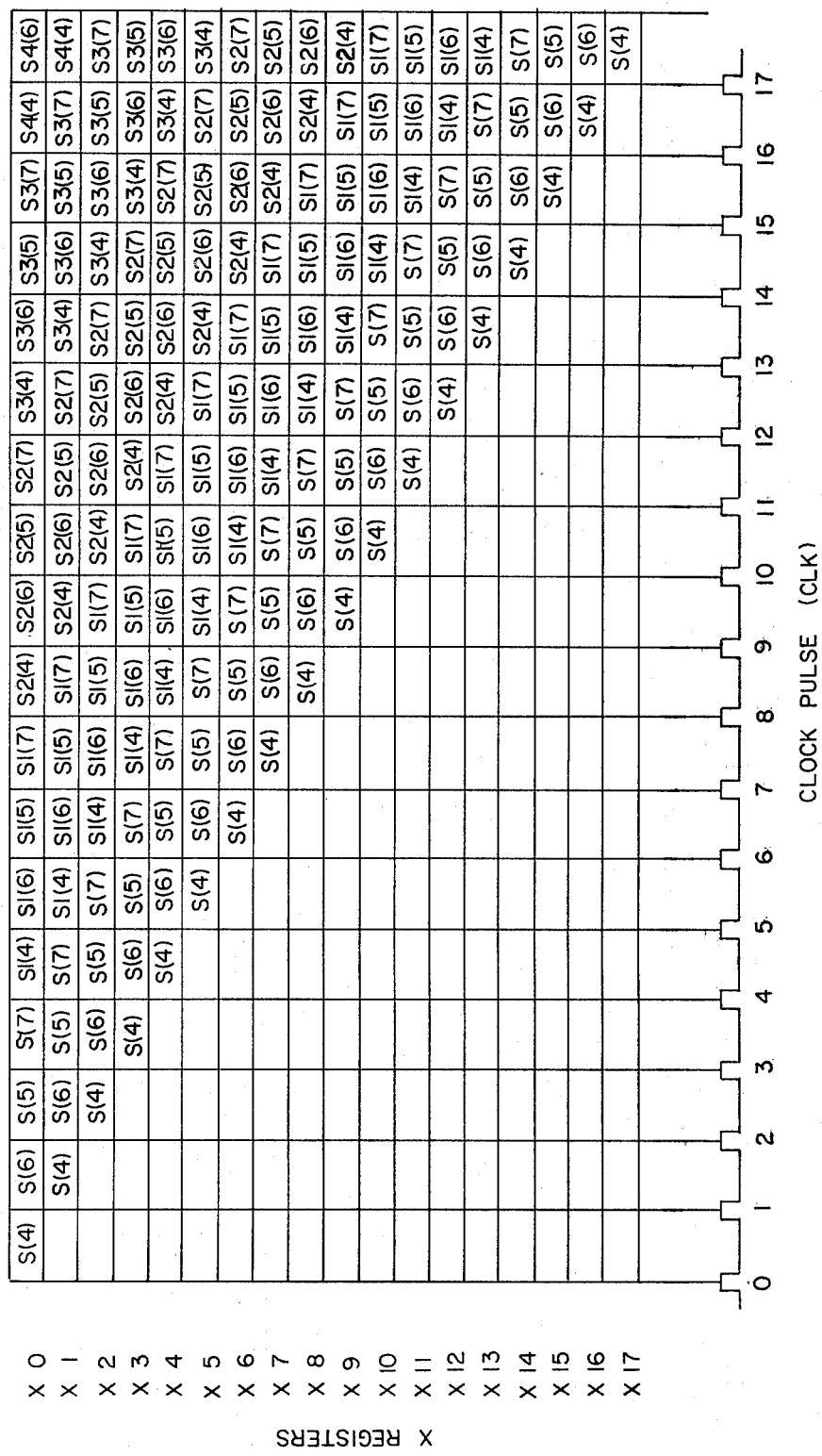
FIG. 5 is a table showing the contents of registers after sequential clocking pulses.

Referring to FIG. 5, the sequential clocking of vectors from an initial start up from time series sample s(4) is shown. For example, after CLK3, s(4) is present in register X3 and therefore has gone through four iterations, s(6) is present in register X2 and has gone through three iterations, s(5) is present in register X1 and has gone through two iterations, and s(7) is present in X0 and has only gone through the 90 iteration. The other series designated sl(n), s2(n) and s3(n) represent the time series inputs from sequential radar pulse returns.

Figure 6:
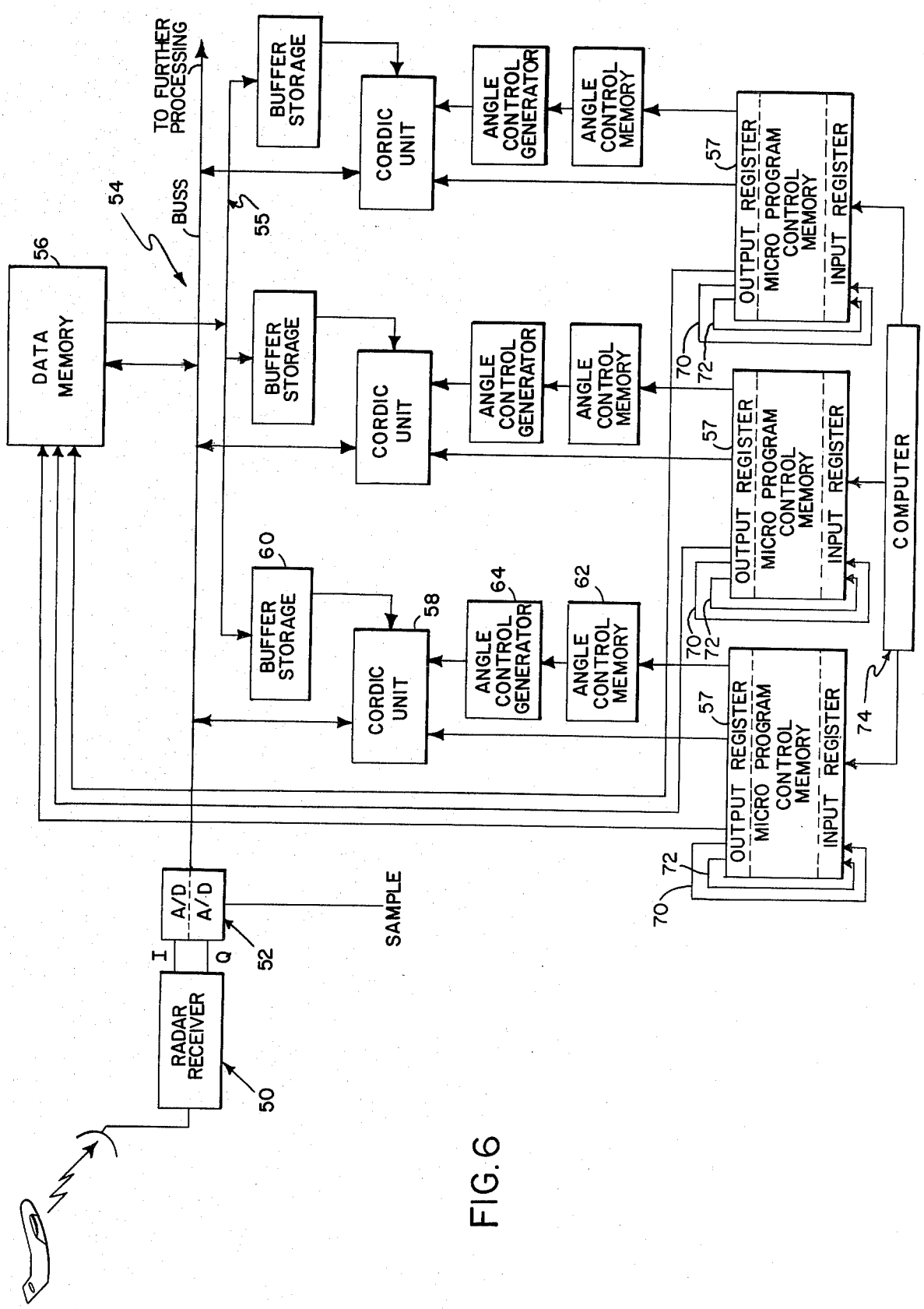
FIG. 6 is a block diagram of the CORDIC FFT processor embodying the invention.

Referring to FIG. 6, a block diagram of the CORDIC FFT processor embodying the invention is shown. The inphase and quadrature channels of radar receiver 50 are digitized in analog to digital (A/D) converter 52 at a sample rate at least equal to the highest frequency of interest (normal Fourier transform requires twice the rate but here both inphase and quadrature are sampled). The output of the A/D converter is a time series of digital words, preferably 32 bits in length with 16 bits derived from the inphase channel and 16 bits derived from the quadrature channel. These words are transferred along buss 54 and stored in data memory 56.

Microprogram control memory 57 sequentially provides addresses to data memory 56 which cause appropriate digital words corresponding to $\vec{B}$'s in FIG. 2 to be read out of data memory on buss 54 and into CORDIC unit 58 where the process as described with reference to FIG. 4 is performed. Specifically, the 16 bits corresponding to the inphase receiver channel are transferred in the path designated REAL in FIG. 4 and the 16 bits corresponding to the quadrature channel are transferred in the path designated IMAGINARY. Microprogram control memory 57 also sequentially provides addresses to data memory 56 which cause appropriate digital words corresponding to $\vec{A}$'s in FIG. 2 to be read out of data memory 56 onto buss 55 and stacked into buffer storage 60. The purpose of buffer storage is to provide $\vec{A}$ to vector adder 38 and subtractor 40 of FIG. 4 approximately simultaneous to the clocking of the corresponding rotated $\vec{B}$ into X17 and Y17 registers. Accordingly, if a $\vec{A}$ is read out of data memory simultaneous to the corresponding $\vec{B}$, buffer storage provides a delay of 17 CLK pulses while $\vec{B}$ is being vector rotated by the process as described with reference to FIG. 4. Again referring to FIG. 4, $\vec{A}'$ and $\vec{B}'$ are clocked into registers 42 and 44 respectively and back into data memory.

Simultaneous to the reading of $\vec{B}$'s out of data memory and into CORDIC units, the microprogram control memory 57 generates an address for the angle control memory 62. For a 16 point FFT where there are eight possible vector rotation angles as shown in FIG. 3, a three bit address field is sufficient. For the example of FIG. 3, each address would have as is contents one of the horizontal patterns shown in FIG. 3. The pattern comprised of seventeen bits (the bit for 90° is not used because always a counterclockwise rotation) is input to the angle control generator 64 commonly comprising a plurality of shift registers. The angle control generator sequentially provides logic inputs AC0 through AC16 as a $\vec{B}$ is clocked through the respective registers as shown in FIG. 4. AC0 corresponds to vector rotation through $\tan^{-1} 2^0$; AC1 corresponds rotation through $\tan^{-1} 2^{-1}$, etc.. The angle control generator provides the sequential logic inputs immediately prior to the clocking of the respective vectors into each register. For example, AC0 and its invert are present at arithmetic add/subtract elements 16 and 14 respectively just prior to CLK0 loading registers 10 and 12 with $\vec{B}$ for the particular angle rotation. Next, AC1 and its invert are present at arithmetic add/subtract elements 28 and 26 just prior to CLK1 loading registers 22 and 24.

Again referring to FIG. 6, three identical CORDIC units and associated control blocks are shown. Although any number of one or more CORDIC units could be used, it may be preferable to have one CORDIC unit for each serial stage of "butterflies" in the FFT. For example, for the 8 point FFT in FIG. 1, there are three serial stages with respective inputs of s(n), a(n) and b(n) so it may be preferable to use three CORDIC units as shown in FIG. 6. As stated heretofore, radar applications commonly use FFT processors with considerably more than eight points; typical FFT processors use 128, 256, 512 and 1024 points which respectively have 7, 8, 9 and 10 serial stages of "butterflies". Accordingly, in radar applications, it may be preferable to use considerably more than three CORDIC units. For the example of an eight point FFT as shown in FIG. 1 and three CORDIC units as shown in FIG. 6, it is preferable that one CORDIC unit process the s(n) inputs, a second CORDIC unit process the a(n) inputs, and the third CORDIC unit process the b(n) inputs. Accordingly, the data memory can be partitioned into four areas. One area is where all the digitized samples from the receiver are sequentially stored and from which one microprogram control memory reads. A second area is where the results of the first CORDIC unit are stored and from which a second microprogram control reads. A third area is where the results of the second CORDIC unit are stored and from which a third microprogram control memory reads. The fourth area is where the results of the third CORDIC unit are stored while waiting for read out to another device (not shown). The use of more CORDIC units than one provides for simultaneous CORDIC computation and therefore increases the throughput rate of the processor. Therefore, with a plurality of CORDIC units, the data is not only pipelined through each CORDIC unit but also from CORDIC unit to CORDIC unit.

Also part of the output register 59 of a microprogram control memory is a field for providing a sequential address for the microprogram control memory. As shown in FIG. 6, line 70 is for increment control to advance to the next higher data memory address and line 72 provides for branching to another address. It is further noted that computer 74 provides an override for the normal increment and branch address control provided by line 70 and 72; this provides for the FFT processor to be programmable such that the FFT's of varying numbers of points may be computed. The programmable feature is important in radar applications where waveforms of varying time-bandwidth products are desirable. For example, by increasing the pulse width, more energy can be transmitted for detection at greater ranges without increasing the peak power of transmission. Conversely, by descreasing the pulse width, more pulses per time can be transmitted to increase the coverage area and also to provide closer in detection. As the width of the waveform is changed, it may be desirable to also change the number of points in the FFT. This is rapidly provided by storing a program for the processing of each number of points in each microprogram control memory and using the computer to simultaneously branch all microprogram control memories from one FFT point program to another.

As noted heretofore and known in the art, a vector magnitude error is inherent in the calculation of a vector rotation using the CORDIC technique. This error which results from each rotation not being on true circle converges after 16 iterations to a value 1.6467 greater than the actual value. Although the error may not be of significance in many applications, it can be compensated for because it is known and fixed. For example, if it is preferable to normalize $\vec{A}$ and the rotated $\vec{B}$ as depicted in FIG. 2, one of several methods can be used. First, $\vec{A}$ can be multiplied by 1.6467 before being input into vector adder and vector subtractor as shown in FIG. 4. Second, $\vec{A}$ can be vector rotated with $W_n=0°$ to provide the same error (1.6467) as the rotated $\vec{B}$. Third, $\vec{B}$ can be multiplied by 0.60725 (1/1.6467) either before or after being vector rotated as shown in FIG. 4. The multiplications mentioned in this paragraph can be performed using a lookup multiplier element; it differs from a general purpose multiplier in that it is only required to multiply by a fixed value and can be implemented with a minimum of hardware and executed in a minimum amount of time.

In some applications such as, for example, a pulse Doppler radar with constant false alarm rate (CFAR) processing, the normalized error of the FFT can be compensated for by adjusting the thresholds. In other applications where a direct evaluation of the FFT algorithm is required, it may be preferable to scale the frequency domain outputs by an appropriate factor.

Again referring to FIG. 6, the system as described provides for the calculation of a Fourier transform of radar returns and the storage of the frequency domain results in data memory 56. These results are preferably transferred by bus 54 to further processing. For example, in a pulsed Doppler radar application, the processing heretofore described would typically be the first processing section of a pulse compression processor. The remaining sections would commonly be replica multiplication and inverse Fourier transformation; the inverse Fourier transform could be performed in a similar manner to the Fourier transform described with reference to FIGS. 4 and 6. Subsequent Doppler processing would also preferably utilize a system identical to FIG. 6 to calculate a Fourier transform.

The reading of this disclosure by those skilled in the art will lead to various modifications and alterations without departing from the spirit and scope of the invention as defined in the appended claims. For example, the data memory as discussed could be a plurality of data memories each corresponding to a CORDIC unit. Also, the digital data input from the analog to digital converters could be channeled directly into the first CORDIC unit without being stored in data memory. It is intended, therefore, that the embodiments shown and described be considered exemplary only and that the scope of the invention be limited only by the appended claims.

What is claimed is:

1. In combination:
a plurality of pairs of arithmetic elements adapted for input of two digital words, each of said elements providing as an output either a sum or difference of two input digital words;
a storage means connected to the output of each of said elements;
means for connecting said pairs of elements and storage means in a series, said connecting means hardwire connecting bits of the contents of storage means to inputs of both of the elements of the next sequential pair of elements in said series; and
said connecting means comprising means for bit transpositioning where necessary such that if the contents of two said storage means of a pair of elements are $X_i$ and $Y_i$ where i is the number of the arithmetic element pair in said series, the outputs of the next sequential pair of arithmetic elements in said series will be $X_i \pm 2^{-i}Y_i$ and $Y_i \pm 2^{-i}X_1$, respectively.

2. The combination in accordance with claim 1 further comprising clocking means for clocking digital words through said series.

3. The combination in accordance with claim 2 wherein the arithmetic operation of each of said arithmetic elements is determined by a logic control to each element.

4. The combination in accordance with claim 3 wherein said logic control for each element is opposite the logic control for the other element of said pair.

5. The combination in accordance with claim 4 wherein said storage means is a register.

6. The combination in accordance with claim 5 further comprising means for controlling said logic control to each of said elements such that the contents in the last said registers in said series satisfy the CORDIC equations for vector rotation through a given angle.

7. A system for performing a Fourier transform comprising:
a plurality of computational stages, each stage comprising means for performing arithmetic add and subtract operations on a pair of input digital words and means for storing the results of said operations;
means for coupling said storing means of one stage to the next sequential stage of said series, said coupling means comprising means for hardwire connecting bits of the contents of said storing means of said one stage to inputs of both of said elements in said next sequential stage, said connecting means comprising means for bit transpositioning as required such that if the contents in said storing means of one stage are respectively $X_i$ and $Y_i$ where i is the number of the stage in the series, the coupled inputs to the next sequential stage are $X_i$, $Y_i$, $2^{-i}X_i$ and $2^{-i}Y_i$; and means for clocking pairs of digital word inputs through said stages.

8. The system of claim 7 wherein said means for performing arithmetic add and subtract operations comprises means for providing an add or subtract operation determined by logic control.

9. The system recited in claim 8 further comprising a control memory, said memory providing said logic control.

* * * * *